United States Patent [19]
Gola et al.

[11] Patent Number: 6,032,446
[45] Date of Patent: Mar. 7, 2000

[54] DENSIFICATION METHOD AND APPARATUS FOR HARVESTED COTTON OR OTHER SIMILAR FIBROUS MATERIAL

[75] Inventors: John Anthony Gola, Bordentown; Peter Anthony Basile, Lawrenceville, both of N.J.; Timothy Arthur Deutsch, Newton, Iowa

[73] Assignee: Deere & Company, One John Deere Place Moline, Ill.

[21] Appl. No.: 09/056,259

[22] Filed: Apr. 6, 1998

[51] Int. Cl.⁷ .................................................. A01D 39/00
[52] U.S. Cl. ........................... 56/341; 56/432; 56/16.4 B; 100/88; 100/151
[58] Field of Search .................... 56/341, 432, 16.4 R, 56/16.4 A, 16.4 B; 100/88, 151, 87, 138, 40, 152

[56] References Cited

U.S. PATENT DOCUMENTS

| | | | |
|---|---|---|---|
| 3,020,829 | 2/1962 | Pearson | 56/343 |
| 3,412,532 | 11/1968 | Nickla | 56/12 |
| 3,531,004 | 9/1970 | Gaul et al. | 214/147 |
| 3,680,476 | 8/1972 | Pfeiffer | 100/151 |
| 3,699,881 | 10/1972 | Levin et al. | 100/118 |
| 3,911,654 | 10/1975 | Darnall et al. | 56/350 |
| 3,922,838 | 12/1975 | Kline et al. | 56/344 |
| 4,009,559 | 3/1977 | Mast | 56/343 |
| 4,062,172 | 12/1977 | Rice et al. | 56/343 |
| 4,175,487 | 11/1979 | Molitorisz | 100/8 |
| 4,270,446 | 6/1981 | Molitorisz | 100/8 |
| 4,302,923 | 12/1981 | Molitorisz | 56/341 |
| 4,401,205 | 8/1983 | Komossa et al. | 198/524 |
| 4,534,285 | 8/1985 | Underhill | 100/88 |
| 4,553,378 | 11/1985 | Fachini et al. | 56/16.6 |
| 4,602,471 | 7/1986 | Gray et al. | 53/430 |
| 4,681,523 | 7/1987 | Thelen | 425/168 |
| 4,803,832 | 2/1989 | Crawford | 56/341 |
| 4,838,016 | 6/1989 | Frogbrook et al. | 56/341 |
| 4,912,914 | 4/1990 | Wingard | 56/16.4 B |

(List continued on next page.)

FOREIGN PATENT DOCUMENTS

| | | |
|---|---|---|
| 0350514 | 1/1990 | European Pat. Off. ................. 100/87 |
| 0 431 611 | 6/1991 | European Pat. Off. . |
| 2254708 | 11/1971 | Finland ................................. 100/151 |
| 46 826 | 4/1889 | Germany . |
| 139 340 | 3/1903 | Germany . |
| 1 045 263 | 10/1966 | United Kingdom . |
| 1 427 985 | 3/1976 | United Kingdom . |
| WO 90 12492 | 11/1990 | WIPO . |
| WO 92/14350 | 9/1992 | WIPO ..................................... 56/432 |
| WO 094004020 | 3/1994 | WIPO ..................................... 56/432 |

*Primary Examiner*—Thomas B. Will
*Assistant Examiner*—Arpad Fabian Kovacs

[57] ABSTRACT

A method and apparatus for densification of fibrous material such as harvested cotton, preferably by a movement of the cotton continuously through a compacting zone on the harvester. In one aspect of the invention, the fibers are locked by differential translation of portions of the mass of compacted material to prevent a layer of material from springing back after compression. A continuous mat of compressed material with locked fibers is formed into a uniform, high density bale or module on the harvester. A cotton harvester compacting system includes an air system feeding harvested cotton into an accumulation area and to the compacting zone on the harvester. The cotton is compressed and fed through a shear zone which differentially translates the cotton and locks the cotton fibers into a uniform, compact mat. In one embodiment, the mat of compacted cotton is fed to a round baler on the harvester to form a dense round bale or module. In another embodiment, the mat is layered into a rectangular bale or module on the harvester. An in-line horizontal compaction zone allows any existing voids in the in-feed section or voids resulting from compaction or shearing to be closed. A brake zone can be provided after the shear zone to provide adjustable back pressure for improved locked in compaction and web handling integrity. The brake is adjustable to fine tune the system for various cotton types and for different moisture and trash conditions. The accumulation area allows continued harvester operation during brief compacting interruptions, such as during module unloading.

49 Claims, 5 Drawing Sheets

U.S. PATENT DOCUMENTS

| | | | |
|---|---|---|---|
| 4,926,749 | 5/1990 | Neale et al. | 56/341 |
| 4,951,452 | 8/1990 | Lundahl et al. | 56/343 |
| 5,009,062 | 4/1991 | Urich et al. | 56/341 |
| 5,036,652 | 8/1991 | Schmittbetz et al. | 56/16.4 R |
| 5,094,064 | 3/1992 | Thedford | 56/30 |
| 5,205,105 | 4/1993 | Krone et al. | 56/341 |
| 5,255,501 | 10/1993 | McWilliams | 56/341 |
| 5,284,546 | 2/1994 | Tilby | 156/583.5 |
| 5,299,684 | 4/1994 | Ransom | 206/83.5 |
| 5,386,767 | 2/1995 | Edinburgh | 100/48 |
| 5,520,530 | 5/1996 | Siempelkamp | 425/371 |
| 5,555,799 | 9/1996 | Amick et al. | 100/930 RP |
| 5,630,313 | 5/1997 | Von Allworden et al. | 56/16.4 B |
| 5,819,515 | 10/1996 | Ratzlaff et al. | 56/341 |

DENSIFICATION METHOD AND APPARATUS FOR HARVESTED COTTON OR OTHER SIMILAR FIBROUS MATERIAL

BACKGROUND OF THE INVENTION

1. Field of the Invention

The present invention relates generally to cotton harvesting and compacting implements and, more specifically, to a method and apparatus for densification of seed cotton for transport.

2. Related Art

Cotton harvesting operations typically utilize cotton module builders or boll buggies which receive cotton from the picker or stripper basket. Module builders often have a very slow, power consuming module building cycle and require an expensive cotton harvester to sit idle while waiting to offload to the module builder or buggy. A conventional four row cotton picker may require support of at least one module builder, two boll buggies and two tractors. Increasing the size of the picker to six rows requires at least one additional builder and boll buggy, resulting in substantially increased support equipment costs and field management problems from traffic jams in the head row. The cotton harvester basket can be enlarged, but added basket capacity only postpones without resolving the loss of productivity and traffic problems caused by capacity mismatches between the harvester and the supporting cotton handling devices. Offloading and preparing harvested cotton for transport actually becomes the key problem limiting productivity in the field.

Slowness and excessive power requirements of conventional compacting devices result primarily from the inherent inefficiency of compressive action typical of most devices. Each layer of cotton moved to the builder is compressed on top of previous layers of cotton of low spring rate so much of the stroke of the compressing device is absorbed by the previous layers. This inherent inefficiency not only results in slow and inefficient operation, but also causes considerable variation in the density of the resulting cotton module and minimizes the transport and handling integrity of the module. The top layers of conventional modules are virtually uncompressed and easily unsettled during handling for transport.

BRIEF SUMMARY OF THE INVENTION

It is therefore an object of the present invention to provide an improved cotton handling system that overcomes most or all of the aforementioned problems. It is a further object to provide such a system which reduces the amount of support equipment necessary during cotton harvesting operations and improves speed and efficiency of cotton compacting.

It is a further object of the present invention to provide an improved cotton handling system which provides substantially faster and better cotton compacting than at least most previously available systems.

It is a further object to provide an improved cotton compacting method and structure therefor which improves densification, uniformity and transport integrity of the compacted cotton. It is another object to provide such a method and structure which eliminates problems of compression device stroke absorption in previously compacted layers.

It is still a further object of the invention to provide an improved method and an improved structure for compacting fibrous material. It is a further object to provide such a method and structure having substantially continuous compaction to increase material compaction and throughput.

It is another object to provide such an improved method and structure for compacting fibrous material wherein differential translation or movement of portions of compacted material is advantageously used to lock the material in the compressed state. It is another object to provide such a method and structure wherein a continuous mat of compacted material is produced. It is still another object to provide such a method and apparatus wherein a continuous mat of material locked in the compressed state is layered to form an improved bale or the like which is more uniform and easier to transport than bales formed by most previously available methods and structures.

It is another object of the present invention to provide an improved cotton compacting method and structure therefor advantageously utilizing continuous movement of the cotton mass through a compression zone to substantially improve compaction over that achieved with traditional bulk handling methods. It is a further object to provide such a method and apparatus which advantageously utilizes compression followed by differential translation.

It is still another object of the present invention to provide an improved cotton compacting method and structure therefor wherein a combination of compression and differential translation (shear) of the cotton mass locks cotton fibers and maintains the mass in a compressed state substantially better than previously available cotton compacting methods and structures. It is a further object to provide such a method and structure which provides thick cotton web capacity and a higher throughput than at least most previously available cotton compacting methods and structures.

In accordance with the above objects, a method and apparatus for densification of fibrous material such as harvested cotton includes compacting the material, preferably by a continuous movement of material substantially continuously through a compacting zone on the harvester. The compacting zone eliminates problems such as compression absorption and the resulting slow and inefficient operation associated with compression of material on top of an already compressed layer. In one aspect of the invention, the fibers are locked by differential translation of portions of the mass of compacted material to prevent a layer of material from springing back after compression. A continuous mat of compressed material with locked fibers is formed into a uniform, high density bale or module on the harvester. Variations in density and integrity of the compacted mass are reduced substantially over those associated with previously available bulk handling compacting methods and apparatus.

A cotton harvester compacting system constructed in accordance with the teachings of the present invention includes an air system directly feeding harvested cotton into the compacting zone on the harvester. The cotton is compressed and fed through a shear zone which differentially translates the cotton and locks the cotton fibers into a uniform, compact mat. In one embodiment, the mat of compacted cotton is fed to a round baler on the harvester to form a dense round bale or module. In another embodiment, the mat is layered into a rectangular bale or module. An in-line horizontal compaction zone allows any existing voids in the in-feed section or voids resulting from compaction or shearing to be closed. An adjustable brake zone can be provided after the shear zone to provide back pressure for improved locked in compaction and web handling integrity. The brake is adjustable to fine tune the system for various cotton types and for different moisture and trash conditions. A simple, complete cotton processing system can be provided utilizing only five active components including four powered belts and one non-driven belt with intermittent braking action. The cotton processing system has a low power consumption and a capacity matching or exceeding the picking capacity of a six-row cotton picker and on the order eight thousand pounds in twenty minutes, thereby significantly improving the productivity of the picker over that presently available with conventional bulk cotton handling systems and reducing the amount of support equipment and labor necessary to prepare cotton for transport to the gin.

These and other objects, features and advantages of the present invention will become apparent to one skilled in the art upon reading the following detailed description in view of the drawings.

DETAILED DESCRIPTION OF THE DRAWINGS

Figure 1:
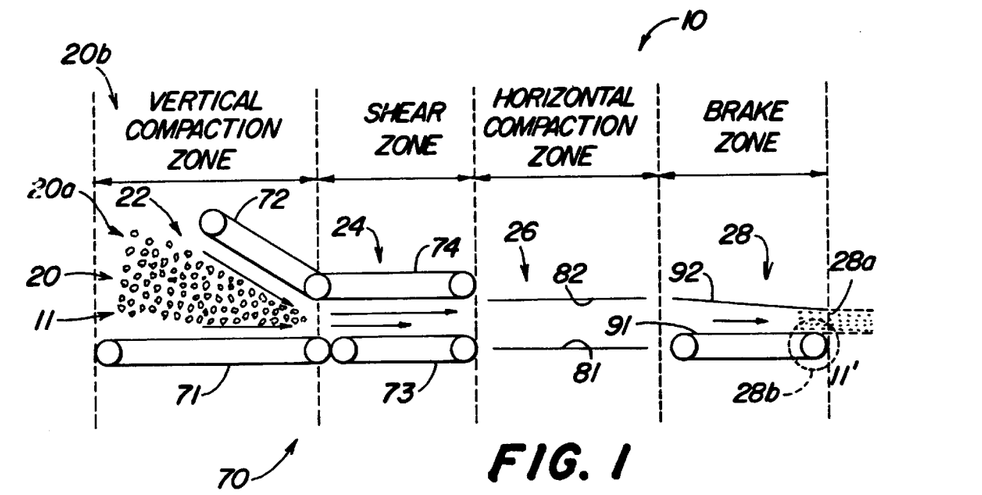
FIG. 1 is a schematic side view representation of a compacting system illustrating principles of the present invention.
Figure 2:
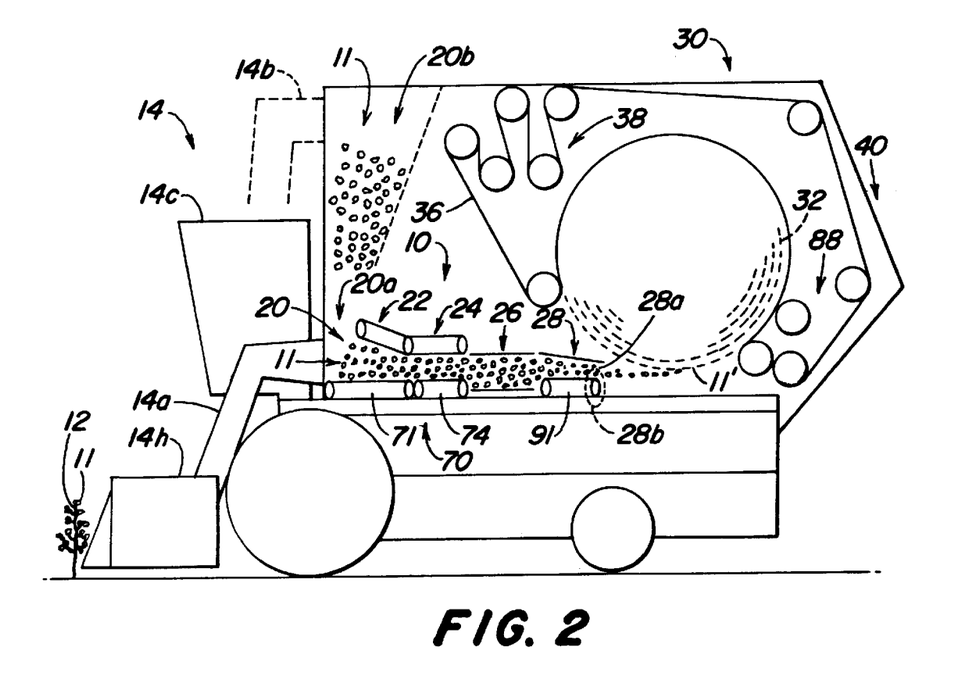
FIG. 2 is a schematic side view of an on-board compacting system of the type shown in FIG. 1 mounted on a cotton harvester.

Referring now to FIGS. 1 and 2, therein is shown a processor 10 for the compaction of fibrous material 11 such as seed cotton harvested from rows of cotton plants 12 by a cotton harvester 14 (FIG. 2). The processor 10 preferably is a continuous motion type having a relatively large, unrestricted in-feed area indicated generally at 20 for receiving the fibrous material in an uncompressed state. A vertical compaction zone 22 opens to the in-feed area 20 and receives the material. The material is immediately moved away from the in-feed area 20 through the zone 22 and is substantially compressed from its free state to a compressed mass in a generally continuous motion process. The in-feed area 20 may also be utilized as an accumulator (20a) so that harvesting can continue if for any reason the processor is stopped momentarily, for example, during movement or unloading of a module from the forming chamber on the harvester.

In a material such as seed cotton, a sphere of spring-like fibers radiate out from the seed, and the material does not take a permanent set when simply compressed. To lock the fibers of the compressed cotton and prevent the material from simply springing back, the compressed material is processed in a shear or differential translation zone 24 which follows the compaction zone 22. The mass of compressed material enters the shear or differential translation zone 24 wherein one portion of the mass is moved differentially relative to another portion of the mass. As the portions are moved differentially, the spring-like fibers of the seed cotton are pulled across each other and interlock to prevent the compressed mass from expanding back towards its original low density state.

As shown in FIGS. 1 and 2, the shear or differential translation zone 24 of the processor 10 is followed by a horizontal compaction zone 26 wherein the compressed material is allowed to move relative to itself in the in-line direction to fill any voids existing within the in-feed area 20 or created during the horizontal compaction or shearing steps of the process. The length of the horizontal compaction zone 26, which preferably is a minimum of several inches, may be increased to provide increased buffering, particularly when compacting system is provided with open or closed loop control. A brake zone 28 located at the exit of the horizontal compaction zone 26 provides compaction system back pressure to help lock in compaction and provide increased integrity of the generally continuous web of material (11') exiting the zone. As shown, the brake zone 28 has two main functional components including a passive exit funnel 28a having a preselected funnel height, and a selectively activatable brake 28b. The passive funnel 28a provides a steady state back pressure for the mat of material 11', and the system is rather sensitive to funnel height. Once an optimum funnel height is established for the material 11 being compressed, the brake 28b provides fine control required to adjust the system to various material types and conditions. Alternatively, the compaction zone 26 may be incorporated directly into the brake zone 28 to reduce the length of the processor.

As shown in FIG. 2, the in-feed area 20 of the processor 10 is located behind the harvester cab 14c near the lowermost portion of the cab. An air duct system 14a conveys the harvested material 11 from the harvesting units 14h directly to the in-feed area 20 and into the processor 10. The in-feed area 20 preferably includes the accumulation area 20a so that the harvester 14 can continue to operate during brief interruptions of the operation of the processor 10, such as during module movement. To increase the capacity of the accumulation area, the outlets from the duct system 14a can be positioned above the cab (14b of FIG. 2) so that the cotton drops through an upper accumulation area (20b) towards the in-feed area 20.

The mat of compressed cotton 11' is fed from the zone 28 to an on-board module builder 30 supported on the cotton harvester frame. The module builder 30 is shown as a round baler which receives the mat of material 11' and forms material into a compact layered bale 32 of high density cotton in a manner similar to formation of a large bale of hay or straw by a conventional round baler. An endless belt 36 trained around adjustable roller assemblies 38 rolls the mat 11' until a large bale is fully formed. Thereafter, the formed bale 32 is released by opening door structure 40 at the rear of the harvester and moving the roller assemblies 38 so the bale is cleared to exit through the opened structure 40. Alternatively, a bale accumulator can be mounted directly on the harvester frame or towed by the harvester, and a fully formed bale can be quickly moved from the bale forming chamber to the accumulator. The accumulator chamber 20a (and 20b) at the in-feed area 20 permits continued harvester operation while the processor 10 stops for a short period of time during bale movement or removal.

Figure 5:
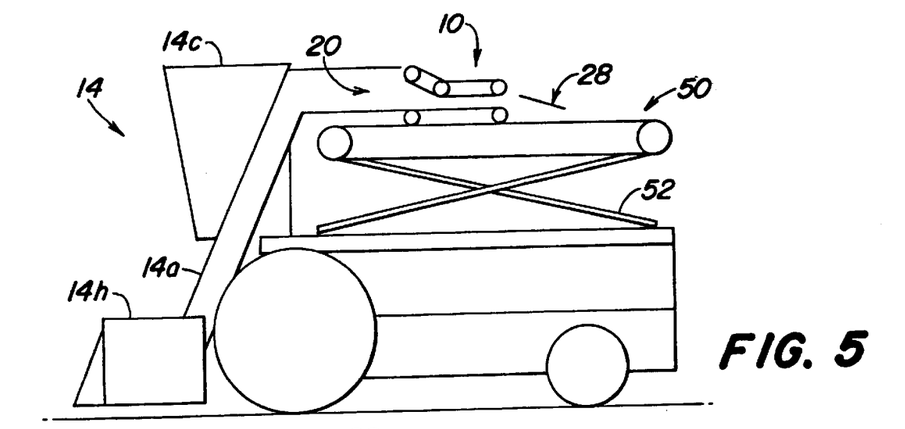
FIG. 5 is a schematic side view of another cotton harvester on-board compacting system.
Figure 6:
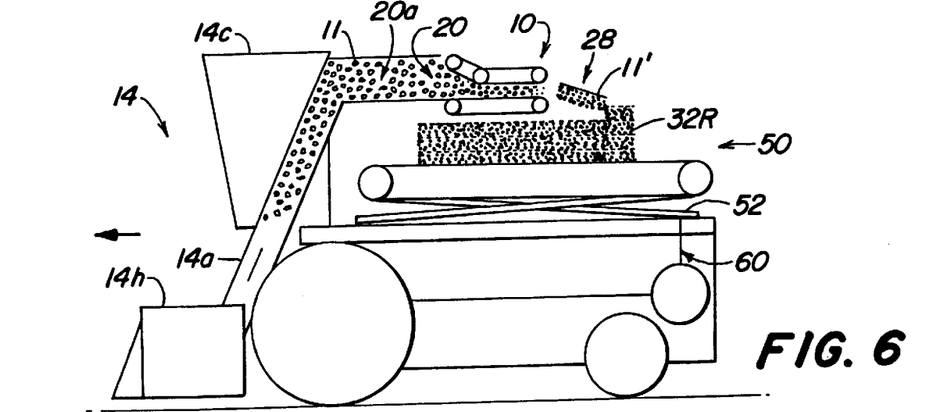
FIG. 6 is a view similar to that of FIG. 5 showing a cotton module being formed on the harvester.
Figure 7:
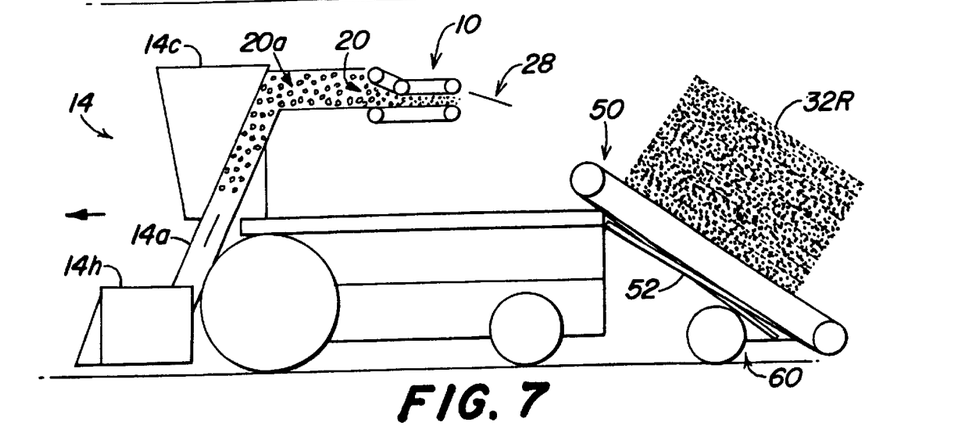
FIG. 7 is a view showing unloading of a formed cotton module.

In an alternate embodiment shown in FIGS. 5–7, the cotton harvester 14 includes an air duct system 14a extending from the harvesting units 14h to a location behind the rear, uppermost portion of the cab 14c. Cotton removed from the rows of cotton plants is propelled upwardly and rearwardly through the in-feed area 20 and accumulation area 20a into the processor 10. The compact, continuous mat 11' formed by the processor 10 is layered into a generally rectangular bale 32R supported on reciprocating platform structure 50. The platform structure 50 is reciprocated in the fore-and-aft direction as the mat 11' exits the zone 28, and a scissors lift 52 adjusts the bale 32R vertically to maintain proper alignment of the bale with the exit zone 28 as the bale grows in height. The structure 50 is shown supported on carriage structure 60 (FIGS. 6 and 7) which is movable rearwardly and downwardly from the operating position of FIG. 6 to an unloading position shown in FIG. 7. Once in the unloading position, the structure 50 can be operated to move the bale 32R downwardly and rearwardly onto the ground.

Referring again to FIGS. 1 and 2, the processor 10 will be described in further detail. The vertical compaction zone 22 and shear zone 24 are shown as opposed belt continuous motion densification structure (indicated at 70). The structure has four powered (friction drive) endless belts including a lower horizontally disposed belt 71 and an upper inclined belt 72 located above and offset at an acute angle relative to the belt 71 so the belts open towards the in-feed area 20. The angle between the belts (compaction angle) is substantially greater than 20 degrees and preferably between 27.5 and 45 degrees. At higher angles, vertical compaction increases and axial compaction decreases. The drive speed of the lower belt 71 is approximately equal to the drive speed of the upper belt 72 multiplied by the cosine of the compaction angle so that horizontal components of the belts are equal and compaction is primarily vertical with little or no shear force on the mass of material 11.

The shear zone 24 provides a shearing motion on the compressed mass of material so that the compressive deflection introduced in the compression zone 22 is locked into the web. The belts 73 and 74 are driven at differential speeds so that the upper portion of the web in contact with the upper belt 74 is translated at a different speed (and thus a different distance for a given period of time) than the lower portion of the web which is in contact with the belt 73. It has been observed that high shear rates, or high differential belt speeds, produce higher density webs than lower shear rates. Throughput speeds can be increased by providing higher belt speed in the shear zone 24 with lower differential speed, but the mass flow rate does not increase significantly because the web density decreases with the lower differential speed. The shearing structure in zone 24 can also be in the form of a skid plate structure replacing one of the belts 73 or 74 and an opposed moving member such as the remaining belt 73 or 74.

The horizontal compaction zone 26 establishes relative motion between the cotton material 11 and plates or working surfaces 81 and 82 of the processor 10. In the zone 26, cotton is allowed to move relative to itself in the in-line direction (direction of travel of the web 11') to fill voids created for any reason by the previous processing steps. The plates 81 and 82, as well as the belts 71–74, have a working width approximately equal to the width of the processor chamber, which can vary depending on the capacity of the harvester 14. The plates 81 and 82 are supported in parallel relationship at a distance approximately equal to the spacing between the shear belts 73 and 74 and have a length in the in-line direction on the order of one to two feet. The horizontal compaction zone 26 can be made as short as four inches or less without reduction of the desired closing and interlocking action. However, as pointed out above, the longer lengths provide extra buffer for better open or closed loop system control. Improved results were achieved when the horizontal compaction zone just began to move into the shear zone 24 of the processor 10.

The brake zone 28 includes a passive endless belt 91 and an upper inclined plate 92 which converge in the in-line direction to the exit funnel 28a. As the web 11' is urged through the processor 10 by the belts 71–74, the belt 91 is driven by the web, and the web is pushed through the funnel 28a. The exit funnel height is set and brake 28b is activated at a duty cycle and frequency to set steady state back pressure on the system for good processor operation. The brake duty cycle/frequency can then be adjusted to maintain a back pressure that provides compaction of the web at the exit of the shear zone 24 for ideal system operation regardless of cotton type and fiber length, trash content or moisture level. By way of example only, with a fifty percent duty cycle, braking at a frequency in a range of between one-half and three hertz has produced desired performance.

Although belts with conventional belt drives provide a simple, straight-forward approach to the design of the compaction and shear zones 22 and 24 for a continuous process, rollers or rotating members other than belts, or reciprocating members, can be utilized to provide compaction and shear of the material 11. A belt-type system has been found to be relatively simple and less complex to implement than most other types of systems. It has also been found that compaction followed by shear in substantially a linear manner provides excellent results. If cotton is first compressed to approximately half to two-thirds of its original free height (zone 22) and then differentially translated (zone 24) across the thickness of the compressed web, optimum results are obtained.

Figure 3A:
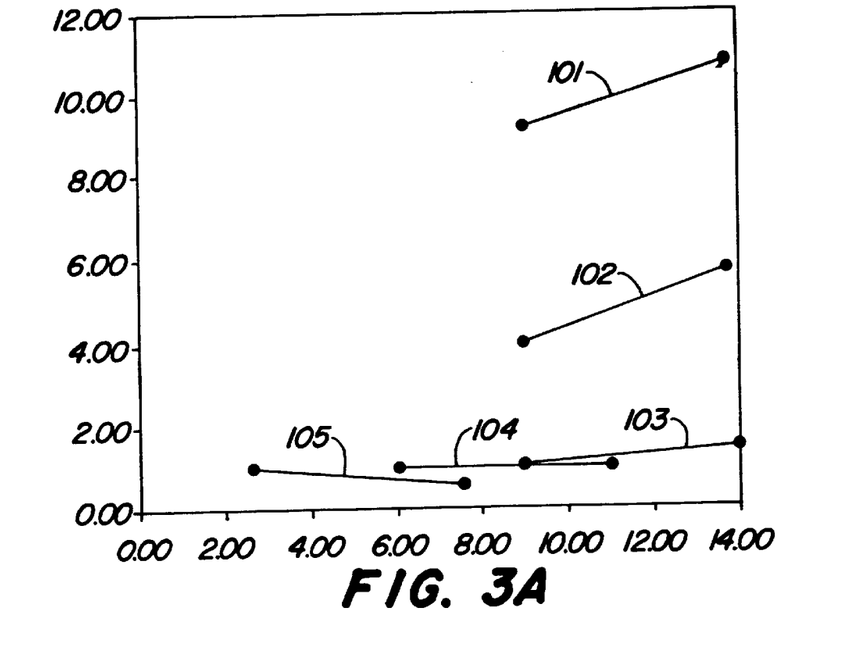
FIGS. 3A–3D are path charts for various compacting schemes showing different positions of a movable compression surface or wave plate, with the x-axes representing wave plate translational positions and the y-axes representing vertical compacting, and with the chart 3A representing a reciprocating motion arrangement with full compaction followed by translational movement and chart 3D representing a rotary motion wave plate path with substantially continuous compression and translation.
Figure 3B:
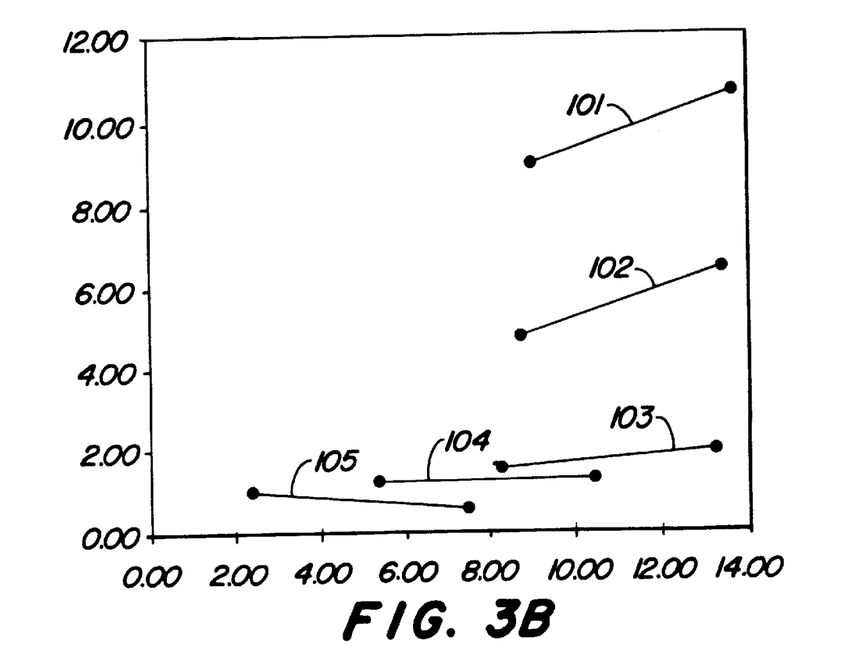
Figure 3C:
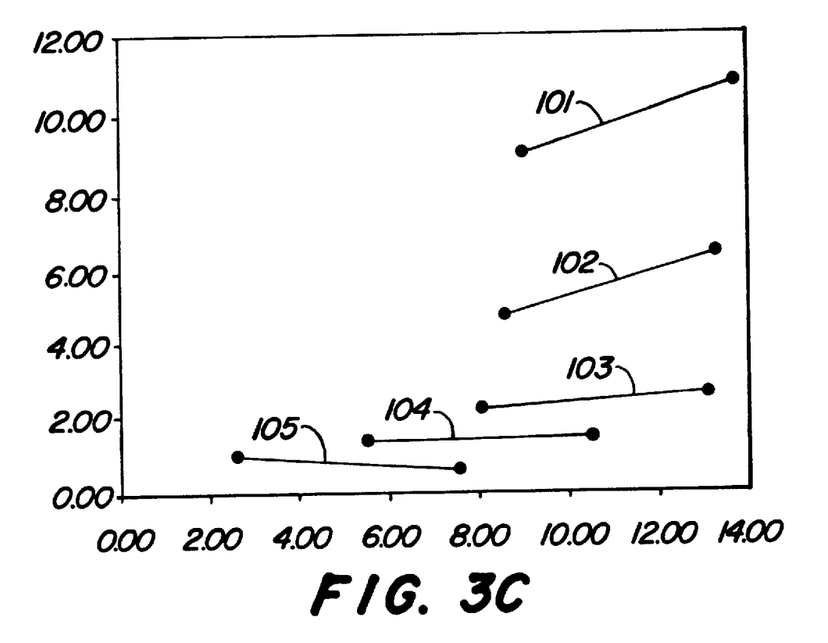
Figure 3D:
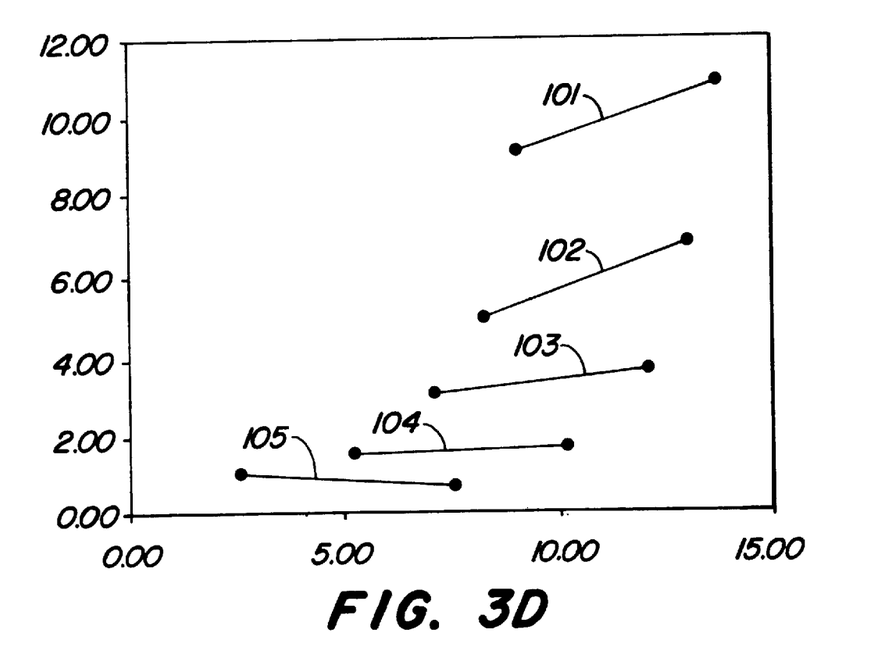
Figure 4:
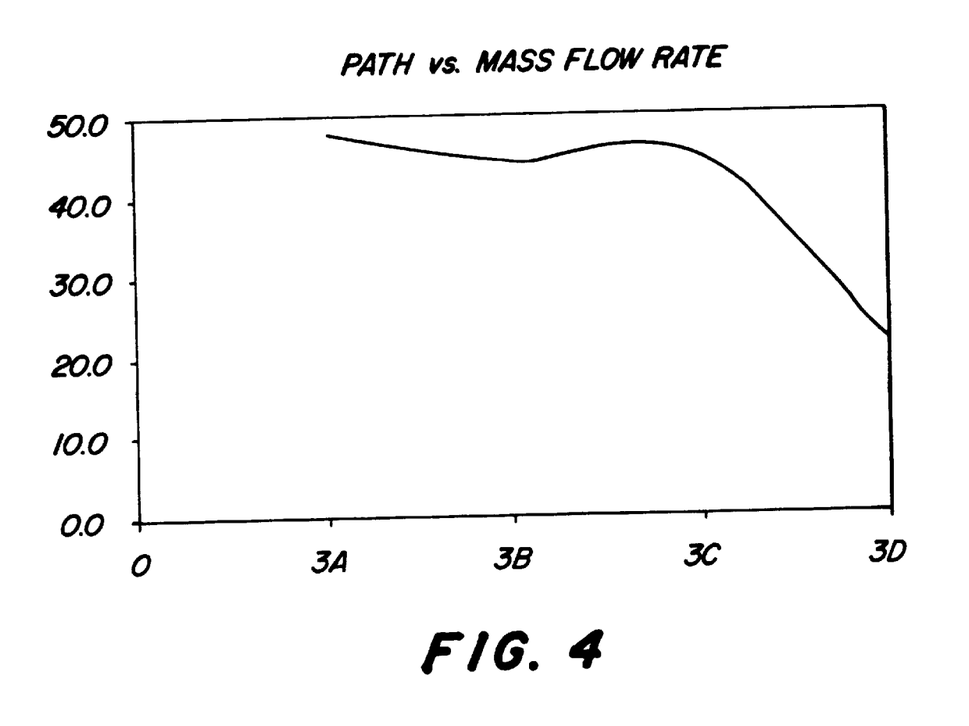
FIG. 4 is a path performance chart for the four path charts of FIGS. 3A–3D showing mass flow rate for a given system when the wave plate is moved in the path shown in the corresponding chart in FIG. 3, the chart illustrating a path based performance decrease for the rotary motion arrangement.

Path based performance of a compactor is illustrated in FIGS. 3A–3D and 4. FIGS. 3A–3D show various paths which include movement of a compression member or wave plate through different sequences (see 101–105), with the sequence of FIG. 3A depicting an orthogonal sequence approximating that achieved with the processor 10 of FIG. 1 wherein vertical straight-line compression (101–103) is followed by horizontal translation or shear (103–105). The paths of FIGS. 3B–3D progress from the orthogonal motion to diagonal motion in which compression and translation occur simultaneously. FIG. 4 shows the mass flow rate for the sequences depicted in FIGS. 3A–3D and indicates that processor throughput falls significantly for the diagonal movement of FIG. 3D.

Having described the preferred embodiment, it will become apparent that various modifications can be made without departing from the scope of the invention as defined in the accompanying claims.

We claim:

1. A compacting method for harvested fibrous material such as cotton, the method comprising the steps of:

compressing a mass of the fibrous material into a volume substantially less than the volume of the material in an uncompressed state; and preventing return of the fibrous material to the uncompressed state, the step of preventing return including locking fibers of the compressed mass of fibrous material;

wherein the step of locking fibers includes differentially translating portions of the compressed mass to pull the fibers across each other.

2. The compacting method set forth in claim 1 wherein the step of differentially translating includes providing relative transverse motion between the portions of the mass of fibrous material in the compressed state.

3. The compacting method set forth in claim 1 wherein the step of differentially translating portions includes moving two opposed portions of the compressed mass between two substanially continuous confining elements and moving one of the portions at a greater speed than the other portion.

4. The compacting method set forth in claim 1 wherein the step of differentially translating portions includes passing the mass of fibrous material between a moving belt and an opposed confining element.

5. The compacting method set forth in claim 4 wherein the mass of fibrous material is pressed against the opposed confining element.

6. The compacting method set forth in claim 1 wherein the step of differentially translating portions includes moving the mass of fibrous material between opposed moving belts having differing speeds.

7. The compacting method set forth in claim 1 wherein the step of compressing the mass of fibrous material includes passing the mass of fibrous material between opposed converging surfaces.

8. The compacting method set forth in claim 7 wherein the step of differentially translating portions includes providing extensions of the opposed converging surfaces with the extensions being sustantially continuous and running generally parallel to each other, and driving the extensions at different rates thereby moving the portions of the compressed mass to provide a shearing force and establish a compressed mat of fibrous material.

9. The compacting method set forth in claim 7 wherein the steps of differentially translating portions and providing a shearing force include continuously moving fibrous material between first and second opposed belt drives, and the step of driving the extensions at different rates includes driving the second opposed belt drive at a higher speed than the first belt drive.

10. The compacting method set forth in claim 7 wherein the step of passing the mass of fibrous material between opposed converging moving surfaces includes moving the fibrous material by driving a pair of opposed converging belt drives.

11. The compacting method set forth in claim 10 wherein the step of providing extensions includes extending the pair of opposed converging belt drives parallel to each other.

12. The compacting method set forth in claim 11 wherein the step of driving the pair of opposed converging belt drives includes driving the belts at speeds relative to each other so that the translational speed of the belts is approximately equal to minimize shear during compression.

13. The compacting method set forth in claim 1 further including the step of providing a continuous mat of compressed fibrous material with locked fibers.

14. The compacting method set forth in claim 13 wherein the steps of compressing and locking are substantially continuous, and further comprising the step of building a module of fibrous material by layering the continuous mat.

15. A compacting method for densification of harvested fibrous cotton having a preselected density, the method comprising the steps of:
providing a cotton compression zone;
compressing the cotton into a compressed mass of a density substantially greater than the preselected density, the step of compressing including moving the cotton through the compression zone substantially continuously; and locking fibers of the compressed mass to prevent substantial reduction of the density toward the preselected density.

16. The compacting method as set forth in claim 15 wherein the step of locking fibers including differentially translating portions of the compressed mass to pull the cotton fibers across each other.

17. The compacting method set forth in claim 16 wherein the step of locking fibers includes providing relative transverse motion between opposed portions of the compressed mass.

18. The compacting method as set forth in claim 16 wherein the step of differentially translating portions substantially occurs away from the compression zone.

19. The compacting method as set forth in claim 16 including the steps of forming a continuously moving mat of cotton and providing a variable back pressure on the mat.

20. The compacting method as set forth in claim 19 including the step of forming a bale of compressed cotton by layering the continuously moving mat of cotton.

21. A cotton compactor for densification of a mass of cotton of preselected density harvested by a cotton harvester, the cotton including cotton fibers, the compactor comprising:
compressing structure for compressing the mass of harvested cotton to a compressed mat of density substantially greater than the preselected density;
wherein the compressing structure includes a moving element providing substantially continuous movement of the mat without substantial shear forces on the mass; and
module building structure located downstream of the compressing structure receiving the compressed mat and including layering structure forming the compressed mat into a compact bale.

22. The cotton compactor as set forth in claim 21 wherein the compressing structure comprises a rotating member for contacting the mass of harvested cotton and an opposing surface angled relative to the rotation member to define a converging cotton receiving area, the rotating member moving the mass of harvested cotton in the direction of the convergence to compress the cotton.

23. The cotton compactor as set forth in claim 21 wherein the module building structure comprises a baling implement connected to the cotton harvester and receiving the compressed mat.

24. A cotton compactor for densification of a mass of cotton of preselected density harvested by a cotton harvester, the cotton including cotton fibers, the compactor comprising:
compressing structure for compressing the mass of harvested cotton to a compressed mat of density substantially greater than the preselected density;
wherein the compressing structure includes a moving element providing substantially continuous movement of the mat; and
further comprising shearing structure moving portions of the compressed mat at different speeds relative to each other to pull the cotton fibers across each other and interlock the fibers to prevent the compressed mass from expanding back towards the preselected density.

25. The cotton compactor set forth in claim 24 wherein the shearing structure comprises first and second belts driven at different speeds in contact with the portions of the compressed mat.

26. The cotton compactor set forth in claim 24 wherein the shearing structure comprises a pair of belts extending from the compressing structure, the pair of belts driven at different speeds in contact with the portions of the compressed mat to provide shear forces on the compressed mat.

27. The compactor as set forth in claim 22 wherein the shearing structure comprises means for moving offset portions of the mat at different speeds, the means including a driven belt contacting one portion of the mat and an opposed surface in contact with another portion of the mat.

28. A cotton compactor for densification of a mass of cotton of preselected density harvested by a cotton harvester, the cotton including cotton fibers, the compactor comprising:
    compressing structure for compressing the mass of harvested cotton to a compressed mat of density substantially greater than the preselected density;
    wherein the compressing structure includes opposed members providing compaction of the mass without substantial shear forces on the mass and a moving element providing substantially continuous movement of the mat without substantial shear forces on the mass.

29. A cotton compactor for densification of a mass of cotton of preselected density harvested by a cotton harvester, the cotton including cotton fibers, the compactor comprising:
    compressing structure for compressing the mass of harvested cotton to a compressed mat of density substantially greater than the preselected density;
    wherein the compressing structure includes a moving element providing substantially continuous movement of the mat;
    a baling implement supported on the harvester and including operable unloading structure; and
    an air system transporting cotton from the harvester to the compression structure, wherein the compression structure opens to the air system, and further including an accumulation area downstream of the air system so that the harvester can continue to operate during brief intervals when the unloading structure is operating.

30. A cotton compactor for densification of a mass of cotton of preselected density harvested by a cotton harvester, the cotton including cotton fibers, the compactor comprising:
    compressing structure for compressing the mass of harvested cotton to a compressed mat of density substantially greater than the preselected density;
    wherein the compressing structure includes a moving element providing substantially continuous movement of the mat;
    receiving structure for receiving the compressed mat and layering the compressed mass in compacted module form; and
    including shearing structure providing a substantially continuous mat of cotton on the cotton harvester, the shearing structure pulling the cotton fibers across each other and interlocking the fibers to prevent the compressed mass from expanding back towards the preselected density.

31. A cotton compactor operable for densification of a mass of cotton of preselected density harvested by a cotton harvester, the cotton including cotton fibers, the compactor comprising:
    compressing structure for compressing the mass of harvested cotton to a compressed mat of density substantially less than the preselected density; and
    shearing structure moving portions of the compressed mat differentially relative to each other to thereby cause locking of the cotton fibers to retain the compressed mat in a state substantially denser than the preselected density.

32. The compactor as set forth in claim 31 wherein the compressing structure substantially compresses the mass of harvested cotton without shearing forces.

33. The compactor as set forth in claim 31 wherein the shearing structure includes a moving member providing substantially continuous movement of the compressed mat.

34. The compactor as set forth in claim 31 wherein the shearing structure includes a moving member, the moving member substantially maintaining the compressed mat in a continuous mat form.

35. The compactor as set forth in claim 34 including baling structure connected to the cotton harvester and receiving the compressed mat.

36. The compactor as set forth in claim 35 wherein the baling structure comprises layering structure supported on the cotton harvester and providing a multiple layer bale of uniform density.

37. The compactor as set forth in claim 36 wherein the layering structure comprises a round baler for providing bales of the compressed mat.

38. The compactor as set forth in claim 36 wherein the layering structure comprises a rectangular baler for providing rectangular bales of the compressed mat.

39. The compactor as set forth in claim 31 including an air duct feeding the cotton to the compressing structure, and an accumulation area located between the air duct and the compressing structure permitting continued operation of the harvester during interruptions of the operation of the compactor.

40. A compacting method for fibrous material, the material having radiating spring-like fibers resistant to taking a permanent set when compressed, the method comprising the steps of:
    compressing a mass of the fibrous material to form a compressed mass of the fibrous material;
    locking fibers of the compressed mass of fibrous material; and
    wherein the step of locking fibers includes moving portions of the compressed mass differentially to pull the spring-like fibers across each other and interlock the fibers to prevent the compressed mass from expanding back towards its original low density state.

41. The compacting method set forth in claim 40 wherein the step of compressing the mass includes pressing the mass of fibrous material to a compressed state substantially denser than the mass in an uncompressed state, and the step of moving portions of the compressed mass differentially includes providing relative transverse motion between opposite sides of the mass of fibrous material in the compressed state.

42. A compacting method for densification of fibrous harvested cotton material having radiating spring-like fibers and a preselected density, the method comprising the steps of:
    providing a fibrous material compression zone;
    supporting a compression zone on a cotton harvester;
    providing an accumulation area upstream of the compression zone;
    selectively feeding the fibrous harvested cotton material from the accumulation area to the compression zone;
    compressing the fibrous harvested cotton material into a compressed mass of a density substantially greater than the preselected density;

locking the fibers of the material in the compressed mass to maintain the density of the compressed mass substantially greater than the preselected density; and after the step of compressing the fibrous harvested cotton material, forming the compressed mass into a compact cotton module.

43. The compacting method as set forth in claim 42 including the step of providing a braking zone for the compressed mass to establish a back pressure and thereby help lock the compressed mass into compression.

44. The compacting method as set forth in claim 42 further including the step of blowing harvested cotton through an air system into the accumulation area.

45. The compacting method as set forth in claim 42 wherein the step of compressing the fibrous harvested material includes directing the material between converging surfaces defining a compaction angle of between 20 and 45 degrees.

46. The compacting method as set forth in claim 45 wherein at least one of the converging surfaces includes a continuous belt.

47. The compacting method as set forth in claim 42 wherein the step of compressing includes moving the fibrous material through the compression zone substantially continuously.

48. A compacting method for densification of fibrous harvested cotton material having radiating spring-like fibers and a preselected density, the method comprising the steps of:

providing a fibrous material compression zone;

supporting a compression zone on a cotton harvester;

providing an accumulation area upstream of the compression zone;

selectively feeding the harvested cotton material from the accumulation area to the compression zone;

compressing the fibrous harvested cotton material into a compressed mass of a density substantially greater than the preselected density;

locking the fibers of the material in the compressed mass to maintain the density of the compressed mass substantially greater than the preselected density; and wherein the step of locking fibers includes differentially translating portions of the compressed mass to pull the cotton fibers across each other and interlock the fibers.

49. The compacting method as set forth in claim 48 wherein the step of locking fibers of the compressed mass occurs outside the compression zone.

\* \* \* \* \*

UNITED STATES PATENT AND TRADEMARK OFFICE
CERTIFICATE OF CORRECTION

PATENT NO. : 6,032,446
DATED : 7 March 2000
INVENTOR(S) : John Anthony Gola et al.

It is certified that error appears in the above-indentified patent and that said Letters Patent is hereby corrected as shown below:

Column 1, line 4, insert -- This is a continuation of application serial number 09/056,259 filed 6 April 1998, now abandoned. --

Column 8, line 39, delete "rotation" and insert -- rotating --.

Signed and Sealed this

Seventeenth Day of April, 2001

Attest:

NICHOLAS P. GODICI

Attesting Officer    Acting Director of the United States Patent and Trademark Office